United States Patent [19]

Yataki

[11] Patent Number: 4,583,851
[45] Date of Patent: Apr. 22, 1986

[54] METHOD AND APPARATUS FOR MONITORING OPTICAL FIBER CONCENTRICITY

[75] Inventor: Masamichi Yataki, Chandlers Ford, England

[73] Assignee: Northern Telecom Limited, Montreal, Canada

[21] Appl. No.: 713,736

[22] Filed: Mar. 19, 1985

Related U.S. Application Data

[63] Continuation-in-part of Ser. No. 282,820, Jul. 13, 1981, abandoned.

[51] Int. Cl.[4] ............................................. G01N 21/89
[52] U.S. Cl. ..................................... 356/73.1; 356/431
[58] Field of Search ................... 356/73.1, 384, 385, 356/386, 429, 431; 250/571, 572

[56] References Cited

U.S. PATENT DOCUMENTS

| | | | |
|---|---|---|---|
| 3,069,964 | 12/1962 | Simon | 356/73.1 |
| 3,709,610 | 1/1973 | Kruegle | 356/384 |
| 4,042,723 | 8/1977 | Presby | 356/73.1 |
| 4,269,514 | 5/1981 | Vossberg | 356/386 |

FOREIGN PATENT DOCUMENTS 38248  3/1977  Japan ................................. 356/384

Primary Examiner—Vincent P. McGraw
Attorney, Agent, or Firm—Stuart L. Wilkinson

[57] ABSTRACT

The eccentricity of an optical fiber core within a transparent fiber jacket is monitored by directing light towards the fiber and obtaining a returned light intensity profile as a function of the angle at which light is returned from the fiber. Any deviation from symmetry of the profile is an indication of eccentricity of the fiber core within the jacket. The method can be used for in-line monitoring when producing fiber with an extruded jacket. The technique is substantially simpler than known techniques which require the use of coherent light for generation of optical fringes.

2 Claims, 5 Drawing Figures

METHOD AND APPARATUS FOR MONITORING OPTICAL FIBER CONCENTRICITY

This is a continuation in part to patent application Ser. No. 282,820, filed July 13, 1981, now abandoned.

This invention relates to a method and apparatus for use in in-line monitoring of the eccentricity of a plastic jacket being extruded around a drawn optical fiber.

Plastic jackets are used directly as the cladding for fused silica cores to create very useful large numerical aperture fibers, and also as an overcoat to glass-clad fibers to reduce microbending losses and to enhance mechanical protection. It is highly desirable that the coating be applied concentrically around the fiber to ensure reliable splicing as well as optimum strength and transmission behaviour.

Plastic coatings are applied by various methods, and techniques have been proposed and implemented with varying degrees of success to aid in their concentric application. In general, micropositioning and microscopic observations are necessary to align the fiber at the start of each coating application, and only by preparing and microscopically examining sections of the fiber after a production run can the concentricity of the coating be assessed. In addition to being time consuming and destructive, microscopic examination may not detect certain problems, such as geometrical nonuniformities, that can seriously impair the transmission characteristics of the fiber. More importantly, real-time information to enable the fabricator to make corrections, evaluate various applicators, or stop the process completely, is not available as the coating is being applied.

In 1976 a sensitive, non-destructive, and non-compacting method to detect the eccentricity of transparent jackets was proposed by Marcuse and Presby, *Applied Optics*, September 1977, Volume 16, No. 9. The method is based on the location of unique fringes in the backscattered light arising from a beam that is incident at right angles to the fiber axis. The method is capable of providing real-time information on coating concentricity as the coating is being applied.

This known method for monitoring fiber eccentricity is relatively complex, requiring a coherent light source and a relatively large imaging area if the fringe pattern is to be electronically converted. The image area cannot be reduced using a lens system since passage through the lens system alters optical path lengths and thus destroys or distorts the fringe pattern. Another disadvantage of this method is that broad maxima in the fringe pattern can often mask the presence of relatively narrow minima.

A simpler method and apparatus are now proposed which gives eccentricity data as detailed as the system previously described and which can also be used to provide information relating to the jacket compositional quality and the jacket and fiber surface quality.

According to one aspect of the invention, there is provided a method of monitoring the core-jacket concentricity of an optical fiber having a core and a jacket the method comprising directing a beam of light from a light source to the fiber, scanning light returned from the fiber using a detection means adapted to scan about an axis of the fiber, detecting the intensity of the scanned returned light, and generating an intensity profile of the detected light as a function of the scanning angle.

Preferably the returned light which diverges from the fiber is rendered converging by a lens. The light can be scanned by a mirror oscillatable about an axis in a plane containing the fiber and the light source, the mirror being located between the lens and a primary focussed position of the converging light. The light can be directed through a slit aperture onto a detector, the slit aperture/detector combination located between the mirror and a secondary focus position of the converging light imaged by the mirror.

For a concentric core-jacket combination, the intensity profile is symmetric relative to the preset angle of incidence but any eccentricity of core position produces asymmetry of the profile. Particularly for an on-line fiber jacketing process, any detected eccentricity can then be compensated for in the jacketing apparatus.

According to another aspect of the invention there is provided apparatus for monitoring the core-jacket concentricity of an optical fiber having a core and a jacket, the apparatus comprising a light source for directing light at the fiber, scanning means for scanning light returned from the fiber, the scanning means adapted to scan about a longitudinal axis of the fiber, detection means for detecting the intensity of scanned light, and means for generating an intensity profile of the detected light as a function of the scanning angle.

The scanning means preferably include said converging lens, and a mirror sited to receive light from the lens. The mirror is preferably rotatable about an axis parallel to the fiber axis and within a plane containing the fiber axis and the light source.

The detection means can include a slit or pinhole aperture also extending parallel to the axis of the fiber, the aperture located to pass light onto a photodetector located adjacent the aperture.

The mirror can be a facet of a rotatable polygonal precision scanner. In an alternative embodiment the scanning means and detection means can be combined as a linear image sensor with a fixed mirror instead of a rotatable mirror.

In the specification, it will be understood that returned light encompasses both a reflective and diffuse component.

An embodiment of the invention will now be described by way of example with reference to the accompanying drawings in which.

Figure 1:
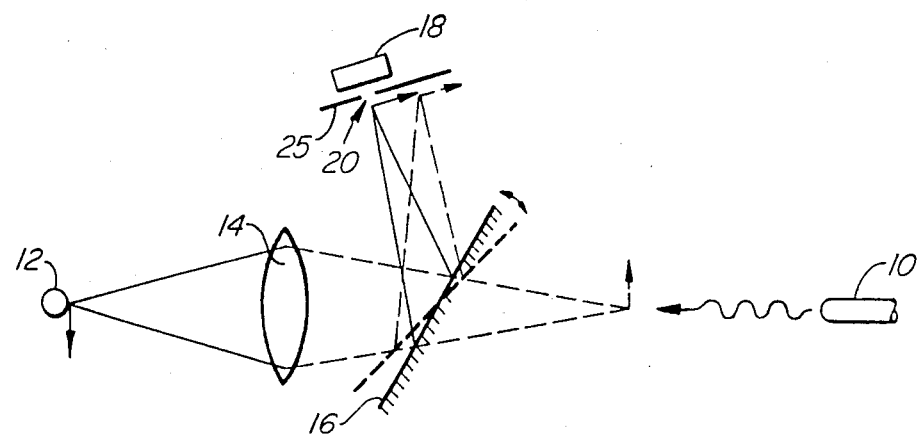
FIG. 1 is a schematic plan view, not to scale, of apparatus according to the invention.

Referring in detail to FIG. 1, a light source 10 directs light at a jacketed optical fiber 12. Light reflected and diffused from the fiber 12 passes through a converging lens 14 and some of the light is directed towards a photodetector 18 after reflection from a mirror 16 forming part of a precision scanner. The light source 10 is a Spectra-Physics Mode 155 He-Ne laser having an output of 0.5 mW and producing a 1 mm diameter beam of uniform wavefront intensity. The jacketed optical fiber 12, in comparison, is typically 0.3 mm diameter. The light from source 10 is reflected and diffused from the fiber 12 with an intensity envelope which depends on the refractive indices of the fiber and jacket materials, on the dimensions of the fiber and jacket, and on the angle at which the light is incident on the jacket surface or the fiber-jacket interface.

Figure 2:
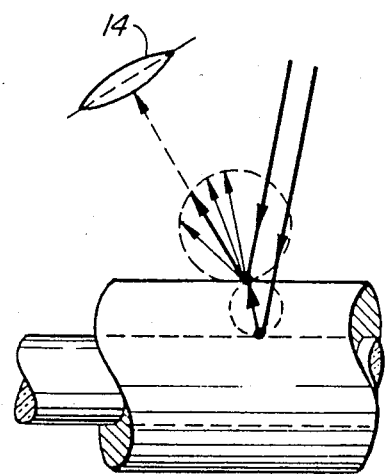
FIG. 2 is a schematic view, not to scale and from one side of the apparatus of FIG. 1, showing light incident on and reflected/diffused from a fiber.

Converging light from the lens 14 is incident on the mirror 16 which forms one facet of a multi-faceted precision scanner of of a type obtainable from the Lincoln Laser Company. The scanner is mounted on a spindle 22 and is rotatably driven about the spindle axis which extends in a plane containing the fiber axis. Light from the scanner is directed towards the photodetector 18 through a slit aperture 20 in a mask 25, the slit aperture extending within a plane containing the fiber axis. A relatively long slit aperture can be used in order to generate a high photodetector current or in order to average image intensity. Alternatively, the aperture is made relatively short and the scanner made to scan the fiber image more rapidly. In this way, increased resolution along the length of the fiber can be achieved, this being important for a rapidly longitudinally moving fiber. On the other hand, operating in this mode demands a high intensity source and a high sensitivity detector. Although not apparent from FIG. 1, the source 10 is vertically displaced from the detecting optics, i.e. mirror 16 and photodetector 18, so that the significant components of the incident and reflected/-diffused light are inclined to the fiber axis as shown in FIG. 2.

Figure 3:
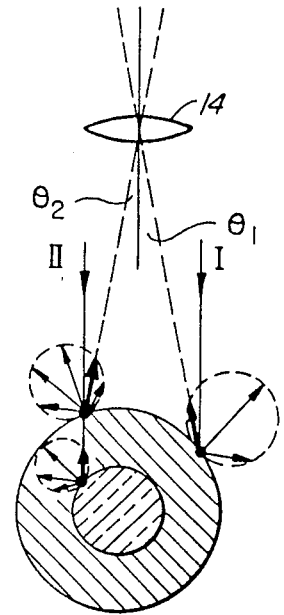
FIG. 3 shows the passage of two exemplary parallel rays, I and II, into the fiber with intensity envelopes of returning light produced by each ray.

As shown by the exemplary rays I and II of FIG. 3, each ray can be considered as having reflection intensity envelopes as shown. In the case of ray I, a single returned light intensity envelope is generated at the jacket surface, whereas in the case of ray II, reflection envelopes are generated both at the jacket surface and at the interface ? of the fiber and jacket. Although these envelopes include a primary reflection ray, there will, in fact, be multiple reflections of relatively low intensity within the fiber and jacket which contribute to the total light returned to the detector from the jacketed fiber in response to incident light. The specific orientation of the mirror 16 corresponds to a particular viewing or scanning angle as indicated in FIG. 3, all light radiating from the fiber at the corresponding viewing angle being directed to the photodetector 18. As shown in FIG. 1 at one angle of the mirror one component of returned light is received at the detector 18 and at a different angle another component returned at a different angle is incident on the detector.

Figure 4A:
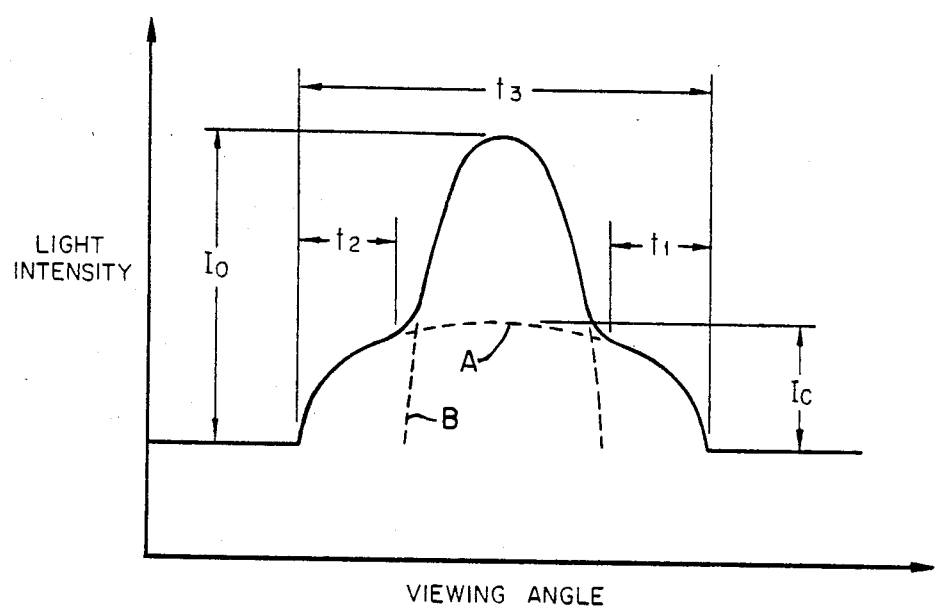
FIG. 4(A) and 4(B) are graphical representations of reflection intensity profiles obtained using the apparatus of FIG. 1.
Figure 4B:
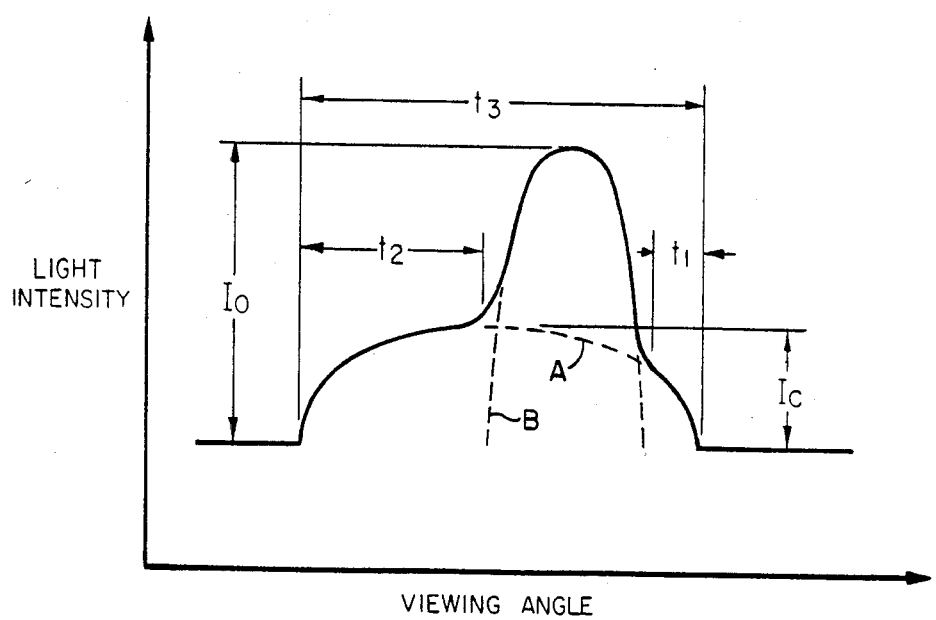

Because of the difference in refractive indices of the jacket and the optical fiber, the intensity profile of the returned light as a function of mirror orientation is as shown in FIG. 4(A). The returning light is a flux which includes the primary reflected ray and diffuse light as indicated by the intensity envelopes indicated in FIG. 3. The light from a fiber coating alone has an intensity profile as a function of mirror angle which typically is represented by the curve A in FIG. 4(A). Similarly, light from an uncoated fiber has an intensity as a function of mirror angle which typically is indicated by the curve B in FIG. 4(A). The light from a coated fiber has a combined intensity as a function of mirror angle which is given by the full line curve of FIG. 4(A). The measure of symmetry of this curve is the measure of the concentricity of fiber and coating. If the core is eccentrically positioned within the jacket, the profile departs from symmetry as shown in FIG. 4(B). Prior calibration using a jacketed fiber having known core-jacket eccentricity is performed in order to relate the asymmetry of intensity profile to fiber jacket eccentricity so that the necessary correction can be calculated.

It will be appreciated that on-line monitoring of jacketed fiber production can take place using the apparatus and method described. The apparatus of FIG. 1 in fact permits only the monitoring of eccentricity in a plane perpendicular to the lens optic axis. In order to monitor any eccentricity perpendicular to that plane, the apparatus including the light source 10 can either be duplicated but located 90° around the fiber or be driven around the fiber axis as fiber is produced.

Although the invention has been described in terms of monitoring a silicone jacket layer formed on a doped fused silica fiber, the method can be used in many other structures in which there exists a discontinuity at the interface of reasonably transparent materials.

In addition, although the converging lens and precision scanner combination represents a convenient way of monitoring fiber reflectivity as a function of image position, other arrangements could be used to project the image of the fiber onto an imager to permit the measured intensity to be related to image position. Thus the scanner can be obviated, and the image focussed directly onto a linear imager; for example, a Toshiba CCD linear image sensor TCD 101 C. Alternatively an imager with a slit aperture can be positioned relative close to the fiber and made to oscillate perpendicularly to the fiber axis.

What is claimed is:

1. A method of monitoring core-jacket concentricity of an optical fiber having a core and a transparent jacket surrounding the core, the method comprising:
   directing a beam of light at the fiber;
   monitoring the intensity of light reflected from the fiber in a range of angles around the fiber axis, said reflected light comprising light reflected from a surface of the jacket in combination with light reflected from a surface of the core beneath the jacket;
   determining the angular position corresponding to a reflected light intensity maximum, the difference between the incident light direction and said angular position indicative of core-jacket eccentricity.

2. A method as claimed in claim 1 further comprising focussing light reflected from the fiber using a converging lens and, using a mirror located between the lens and a primary focus position of the focussed light, oscillating the mirror about an axis in a plane containing the fiber and the light source to direct the reflected light through a slit aperture onto a photodetector, the slit aperture located at or near a secondary focus position of light reflected from the mirror.

* * * * *